July 10, 1962  B. D. SMITH, JR  3,043,514
POSITION PLOTTER
Filed Aug. 27, 1956  4 Sheets-Sheet 1

July 10, 1962 B. D. SMITH, JR 3,043,514
POSITION PLOTTER
Filed Aug. 27, 1956 4 Sheets-Sheet 4
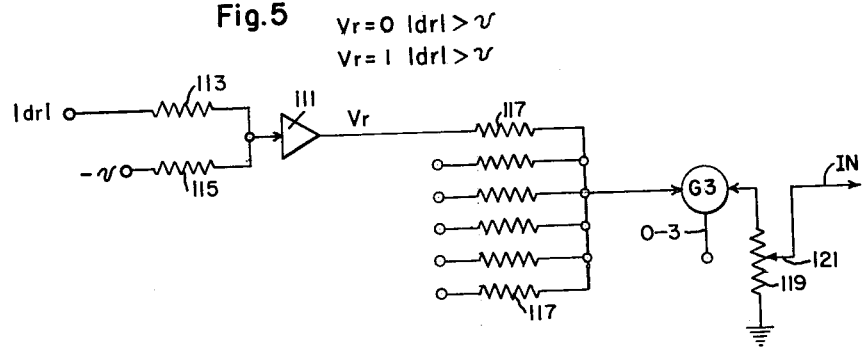
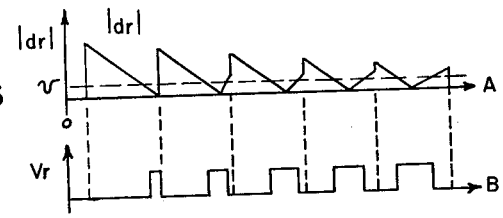
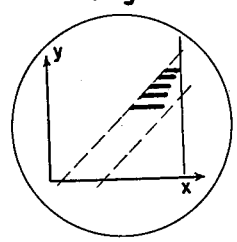
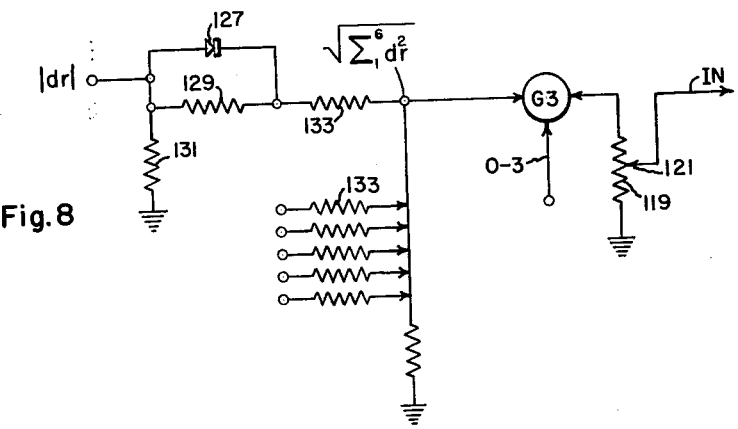

United States Patent Office 3,043,514
Patented July 10, 1962

3,043,514
POSITION PLOTTER
Blanchard D. Smith, Jr., Alexandria, Va., assignor, by mesne assignments, to Melpar, Inc., Alexandria, Va., a corporation of Delaware
Filed Aug. 27, 1956, Ser. No. 606,340
8 Claims. (Cl. 235—181)

This invention relates to computing apparatus and has particular relation to plotting apparatus for locating the geographic position of a point.

Investigators have detected atmospherically produced radio frequency disturbances which occur intermittently for time intervals of short duration of the order of a few milliseconds. Such disturbances are called sferics. For the purpose of detecting and fixing the geographical position of sferics, in accordance with the present invention, a plurality of direction finding stations are provided. These stations are located at spaced points in the region in which the sferics are to be located and each transmits to a central station the bearing of each sferic. The data is assembled at the central station and from the data the geographic position of each sferic is determined. While the present invention has general applicability to position location, it is a specific purpose of the invention to provide an electronic plotter for providing visual position indications based on data transmitted by direction finding stations. In its more specific aspects the invention is intimately concerned with these signal properties which distinguish sferics.

It has been suggested that the positions of sferics be determined with the aid of storage tubes by means of which the bearing information as to the sferics may be stored. The storage-tubes may then be connected to display means in such manner that the coincidences of pulses occurring within certain intervals may be indicated on the display. The extent of such coincidences in each case is a measure of the probability that the sferic is actually at the position for which the number of coincidences occur. Thus, a measure of the probability that a sferic is at a certain point may be obtained.

Storage-tube apparatus for displaying a fix for a sferic is complex, both in structure and in operation, and because of its complexity, is difficult to operate and costly to maintain. In addition, storage-tube apparatus does not operate with the high precision demanded and does not yield a precise measure of the probability that the sferic is actually at the point for which the maximum coincidence is measured.

It is, accordingly, broadly an object of the present invention to provide apparatus which is relatively simple in structure and mode of operation, for computing and producing a visual presentation of the geographic position of a point in space and particularly of the position of a sferic.

Another object of the present invention is to provide a method devoid of complexity, for locating the probable geographic position of a point in space, which is particularly suitable for determining the geographic position of a sferic.

Still another object of the present invention is to provide position-locating apparatus including facilities for computing and locating on a display the geographic position of a point in space, in the use of which the visual signal at each point of the display shall be a true measure of the probability that the position sought corresponds with the indicated point on the display.

It is a more specific object of this invention to provide apparatus for locating on a display device the position of a point in space, for which bearing signals are received for only a short time interval, in which the intensity at each point of the display device shall be a substantially true measure of the mathematical probability that the point to be located is at a geographic point in space corresponding with the point on the display.

It is a further specific object of this invention to provide a method for locating with the aid of a display device the geographic position of a point in space, from which bearing signals are received for only a short time interval, in the practice of which method the geographic position of the point shall be determined by observing the intensity of a continuum of points on the display device, the probability that the geographic position of the point in space is at a point corresponding to any point of the continuum being substantially proportional to the intensity of the point as displayed on the display device.

An incidental object of this invention is to provide a novel computer particularly adapted to cooperate with a display device to determine the geographic position of a point in space by observing the intensity of the display at each point of the display device.

Still another incidental object of this invention is to provide a novel display control circuit particularly suitable for determining the geographic position of a point in space by observing the intensity at each point of the display.

Still a further incidental object of this invention is to provide a novel computer for measuring the distances of the points of a continuum from lines of bearing of a point in space with reference to a plurality of stations, so as to determine the geographic position of the point in space.

Another incidental object of this invention is to provide novel apparatus for converting the bearings of a point in space, signals from which are transmitted for only an interval of short duration, into the sines and cosines of the angles of the bearings.

An ancillary object of this invention is to provide a novel integrating circuit combination, particularly suitable for use in a computer, for determining the geographic position of a point in space.

The present invention is predicated on the realization that the geographic position of a point in space at which a sferic occurs may be determined by identifying the coordinate position of the counterpart of this point on a display. Specifically, it may be assumed that the display has $x$ and $y$ sweeps and these sweeps define a Cartesian coordinate system having an $x$ axis and a $y$ axis, the $x$ sweep being along the $x$ axis and the $y$ sweep along the $y$ axis. The sferic may be located by cooperative synchronized modulation of the intensity of the display and the indication of the sweeps, so that the coordinates of the sferic on the display are identified. While a Cartesian coordinate system is in this case to be preferred, coordinate systems of other types may also be used.

Any sferic, the position of which is to be determined, has a certain bearing with reference to each of the direction finding stations. This bearing, for any direction finding station $r$, will be referred to here as an angle $\theta_r$, where $r$ is 1 for the first station, 2 for the second, and so one. The angle $\theta_r$ may equal the angle between a line joining the sferic and the $r$th station and the North-South line at the station. Each line joining a sferic under observation with a station may be represented by a line of bearing on the display, which is at an angle to the $x$ axis of the display equal to the bearing angle $\theta_r$ for the station $r$. The sferic to be located is at the intersection of the lines from the different observation stations to the sferic and the counterpart of the sferic on the display is at the intersection of the lines of bearing on the display. Thus, the sum of squares of the magnitudes of the distances of each point on the display from the lines of bearing is a substantially true measure of the probability that the sferic has a position corresponding to its counterpart on the display. The less this sum the higher the probability.

In accordance with this invention, then, an apparatus and a method are provided for determining the geographic position of a point in space by determining the point of a display for which the sum of the squares of the magnitudes of the distances to the lines of bearing corresponding to the bearings of the sferic point relative to direction finding stations is a minimum. The point on the display may be visually located by modulating the display according to this sum or as a function of this sum. In accordance with another specific aspect of this invention, the modulation of the display is proportional to the number of such distances whose absolute magnitudes are less than some prescribed amount.

The novel features, considered characteristic of this invention, are described generally above. The invention itself, both as to its organization and its method of operation, together with additional objects and advantages thereof, will become apparent from the following description of a specific embodiment thereof, especially when considered in conjunction with the accompanying drawings, in which:

FIGURE 5 is a fragmental circuit diagram of a portion of the apparatus in accordance with this invention;

FIGURE 6 is a graph illustrating the aspect of the operation of this invention, involved in the circuit diagram shown in FIGURE 5;

FIGURE 7 is a diagrammatic view of the display illustrating the aspect of this invention involved in FIGURE 5; and FIGURE 8 is a fragmental circuit diagram of a portion of a modification of this invention.

Figure 1:
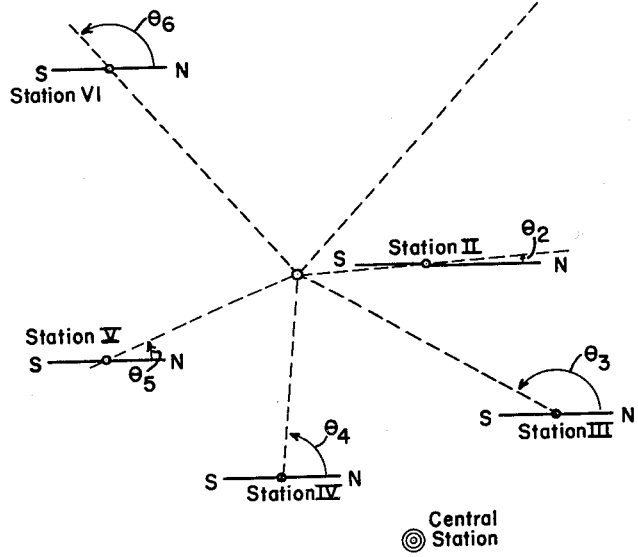
FIGURE 1 is a diagram showing the relationship between a point in space and an observation station.

Referring now more particularly to FIGURE 1, a plurality of stations labeled I to VI are shown as located about the position of a sferic, which is to be determined. At each station the North-South line is shown and the line between each station and the sferic is shown as having an angle $\theta_r$ with reference to the North-South line, where $r$ is a number (from 1 through 6, for example) equal to the identifying number of a station. In addition, a central station is shown at which the bearing signals are received. Apparatus in accordance with this invention may be located at the central stations.

When the position of a sferic is to be determined, a signal is transmitted from each of the bearing stations, the duration of which is proportional to the angle of bearing $\theta_r$ of the particular station. This signal may be a pulse of a certain duration which may modulate a radio frequency carrier. The signal may also be a pair or a plurality of pulses paced in time so that the duration between successive pulses is proportional to $\theta_r$. Usually the pulse signal from each station is initiated when the station receives the sferic.

Figure 2:
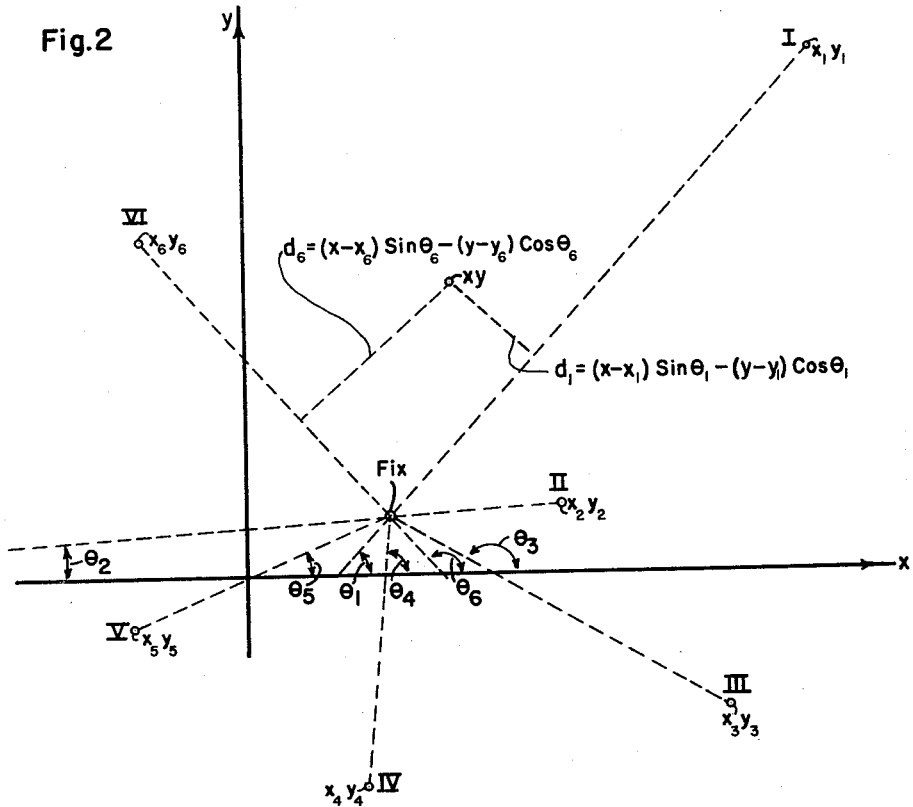
FIGURE 2 is a graph showing, with the aid of Cartesian coordinates, the relationship between observation stations, a point under observation, and certain bearing lines.

FIGURE 2 shows a Cartesian coordinate system having $x$ and $y$ axes on which the positions of the various stations are represented by points I through VI, each point being identified by the numeral of the station to which it corresponds. The coordinates $x_r$ $y_r$ of points I through VI are identified by subscripts equal to the number of the station. The coordinates $x_1$ $y_1$ through $x_6$ $y_6$ correspond to the actual position of the station. A line having an angle $\theta_r$ to the $x$ axis extends from each point I through VI. These are the lines of bearing and they correspond to the lines in space between the sferic and each of the observation stations. The sferic is at the intersection of these lines of bearing in FIGURE 2, which is labeled "fix." The fix may be determined by computing and adding the distances from each point of the continuum $x,y$ to the line of bearings. The distance $d_r$ of any point $x,y$ from the line of bearing corresponding to station $r$ is given by $$d_r = (x - x_r)\sin\theta_r - (y - y_r)\cos\theta_r$$

Thus $d_r$ may be computed for each point $x,y$ once $x_r, y_r$ and $\theta_r$ are known. The probability that the "fix" is at the point is inversely proportional to the sum of the squares of the magnitudes of $d_r$ for each such line of bearing. Where this sum is a minimum, the probability is a maximum, as is now shown.

In the absence of any measurement errors in the angles $\theta_r$ from the stations, the lines of bearing would all intersect at a common point. At this point, or "fix" the distance $d_r$ between the point and each of the lines of bearing would be zero. Thus, if $d_r$ is computed for each line of bearing for each point $xy$, a point would be found where all $d_r$ are zero. That point would evidently be the desired fix. In the presence of errors, however, the lines of bearing may not intersect at any single point. In this case there would be no point $xy$ at which all of the distances $d_r$ to each line of bearing would be zero. In this case, one has to make assumptions regarding the statistical properties of the angular errors in order to determine a "most probable" fix. If the measurement errors are assumed to have the following statistics:

$$dP_r = Ke^{-\frac{d_r^2}{2\theta^2}}dxdy$$

where $d_r$ is the normal distance between the true location $(xy)$ of the source and the measured line of bearing, $dP_r$ is the probability of observing the angle $\theta_r$ if the true location of the source is between $x$ and $x+dx$ and between $y$ and $y+dy$, $\theta$ is the standard deviation or root-mean-square error in $d_r$ and K is a normalizing factor such that the integral of $dp$ is unity, and if the errors associated with the different stations are independent of one another, then the probability that the true location of the fix is at the point $xy$, taking into account all of the $r$ lines of bearing, is the product:

$$dP_1 dP_2 dP_3 \cdots dP_r = K^r e^{-\frac{1}{2\theta^2}\sum_{1}^{r}d_r^2}(dx)^r(dy)^r$$

Where $$\sum_{1}^{r}d_r^2$$

is the sum of the squares of the normal distances $d_r$ between the point $xy$ and each line of bearing. Thus the probability that the fix is at the point $xy$ depends upon the sum of the squares of the normal distances $d_r$. Because of the negative exponent in the above relation, the smaller the sum of squares of $d_r$ the larger the probability and vice versa. The above relation shows that to detect a "fix," assuming the error statistics are as indicated above, one should obtain the sum or the square root of the sum of the squares of the magnitudes of $d_r$ and indicate the fix at the point $xy$ where this sum is a minimum. In a similar manner, if the statistics of the measurement errors by each station are such that:

$$dP_r = Kdxdy \text{ if } |d_r| < \text{ some constant, } a$$

$$dP_r = 0 \text{ if } |d_r| > \text{ some constant, } a$$

where K is a normalizing constant and $|d_r|$ is the magnitude of the normal distance between the true location $xy$ of the source and the measured line of bearing, then the probability that the fix is at the point $xy$, taking into account all of the $r$ lines of bearing, is the product $dP_1 dP_2 \ldots dP_r$ which is zero except for the region where all $|d_r|$ are less than the constant, $a$. In this case, one should determine the magnitudes of each $d_r$ and indicate the fix at the point $xy$ where all $|d_r|$ are less than the constant $a$, or where some minimum number of $|d_r|$ are less than $a$ in the case where all stations do not detect and transmit the bearing data from a particular source.

*Description*

Figure 3:
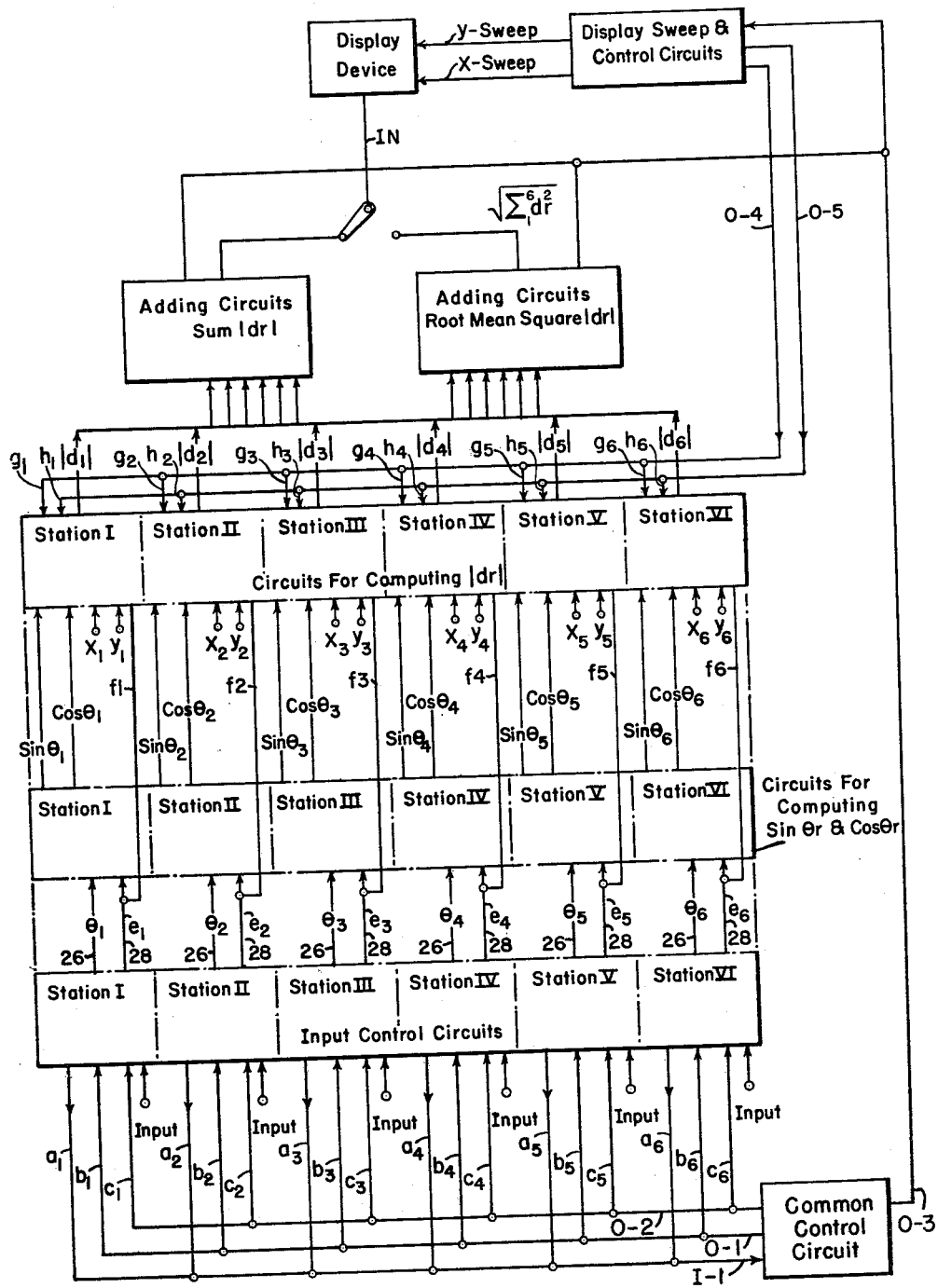
FIGURE 3 is a block diagram of apparatus in accordance with this invention.
Figure 4:
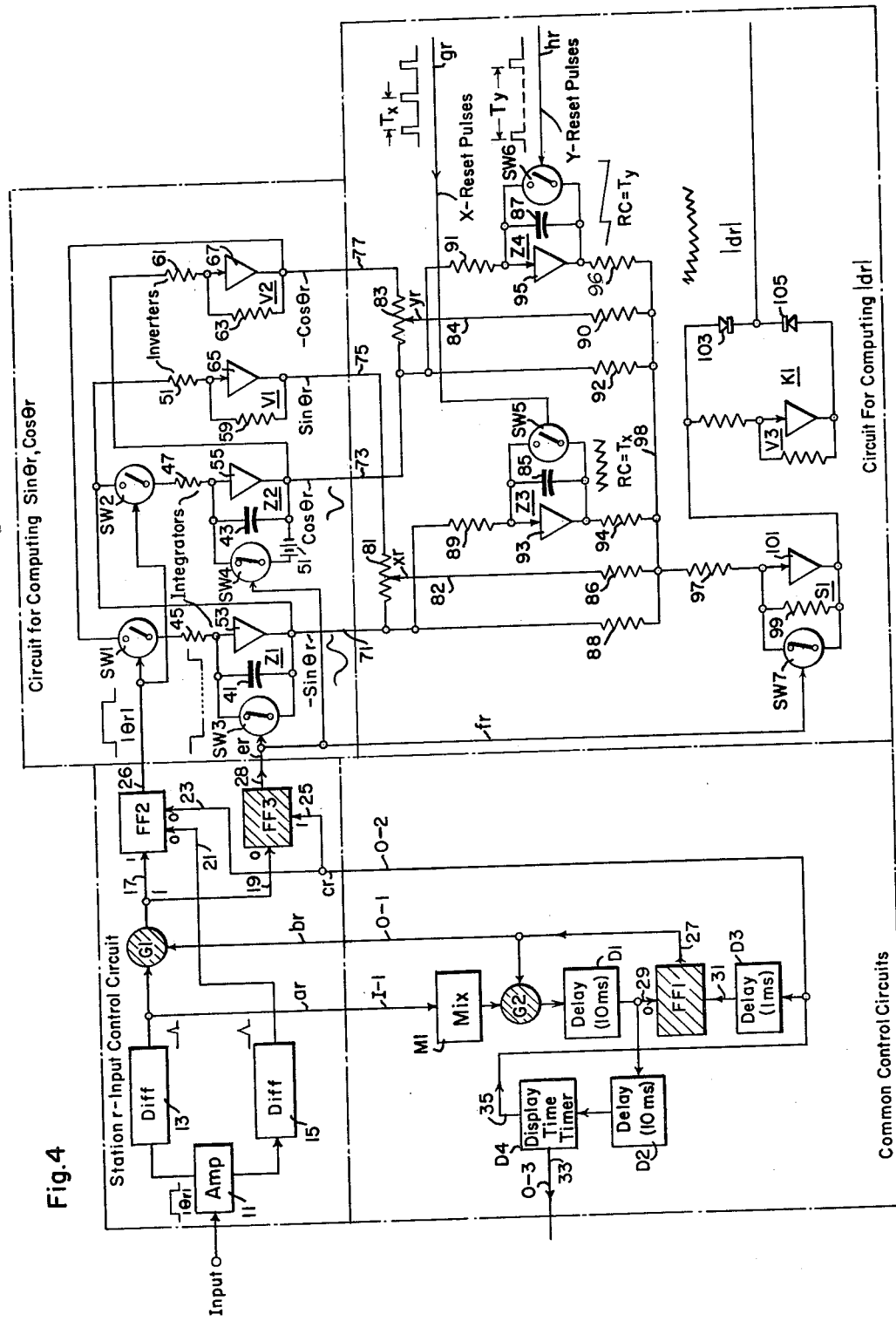
FIGURE 4 is a block diagram showing the specific features of this invention.

The apparatus for computing $|d_r|$ and showing the minimum of the sum of $|d_r|$ for $r=1$ through $r=6$ is shown in FIGURES 3 and 4. This apparatus includes a plurality of individual Input Control Circuits which are labeled in FIGURE 3 with the numerals corresponding to the stations. Each of the circuits has an input terminal on which the bearing signal $\theta_r$ from each of the direction finding stations is impressed. Each of the Input Control Circuits decodes the $\theta_r$ signal and transmits the decoded signal from its output.

With the six input control circuit a Common Control Circuit cooperates. This Circuit has an input conductor I–1 which is connected to conductors $a_1$ through $a_6$ of the Input Control Circuits. The Common Control Circuit also has output conductors O–1 and O–2 connected to conductors $b_1$ through $b_6$ and $c_1$ through $c_6$, respectively, of the Input Control Circuits. When the first signal is received by the Input Control Circuits a resulting signal is transmitted through one of the conductors $a_r$ and I–1 to the Common Control Circuits and the latter times an interval during which a series of signals are received, their magnitude $|d_r|$ computed, and a display produced. The control of the Input Control Circuits by the Common Control Circuit is affected through conductors O–1 and O–2 and $b1$ through $b6$ and $c1$ through $c6$, and the display is controlled by a signal transmitted through O–3.

A Circuit for Computing $\sin \theta_r \cos \theta_r$ is associated with each Input Control Circuit. Each Input Control Circuit transmits to the associated Circuit for Computing $\sin \theta_r \cos \theta_r$ the decoded $\theta_r$ signal. Each Input Control Circuit has an additional output conductor $e1$ through $e6$ from which a reset signal is derivable.

A Circuit for Computing $|d_r|$ is associated with each Circuit for Computing $\sin \theta_r$ and $\cos \theta_r$. Each Circuit for Computing $|d_r|$ receives from its associated Circuit signals corresponding to $\sin \theta_r$ and $\cos \theta_r$, has impressed thereon signals corresponding to $x_r$ and $y_r$ and delivers at its output a signal corresponding to $|d_r|$. Each Circuit for Computing $|d_r|$ is connected through a conductor $f_r$ to the associated reset conductor $e_r$ and is adapted to be reset when a signal is impressed on conductor $e_r$.

The apparatus also includes a Display Device and Display Sweep and Control Circuits for the Display Device. The Display Device has means for controlling the intensity of the display; this means may be energized through a conductor IN. The Display Sweep and Control Circuits are connected to supply sweep signals to the Display Device $x$ and $y$.

The apparatus also includes an Adding Circuit in which the number of those values of $|d_r|$ which are less than some prescribed amount is computed. This circuit receives signals corresponding to $|d_r|$ from the Circuits for Computing $|d_r|$ and delivers a signal corresponding to the number of such values of $|d_r|$ which are less than the prescribed amount. This Circuit includes means for suppressing the transmission of any $|d_r|$ signal which exceeds the prescribed magnitude (FIGS. 5 and 6). The output of the Adding Circuit is impressed on conductor IN to modulate the display. FIGURE 3 also shows an alternative Adding Circuit from which the signal corresponding to the square root of the sum of $d_r^2$ may be derived. The output of this circuit may also be connected to conductor IN. With the apparatus shown in FIGURE 3 intensity of the display at any instant may be determined by some function of either number of the values of $|d_r|$ less than the prescribed amount or the square root of the sums of the square of $d_r$. The intensity of the display at any instant is the intensity at a point $x,y$ on the Display Device. The sweeps for the Display Device are so synchronized with the Circuits for Computing $|d_r|$ that at the instant when any point from the display is being swept, the intensity at the point as determined by the intensity control means of the Display Device is proportional to some function of either the number of the values of $|d_r|$ for that point which are less than the prescribed amount, or to the square root of the sum of the squares of $d_r$ for that point, depending on which adding circuit is connected to IN.

The $x$ and $y$ sweeps for the Display Device are linear sawtooth waveforms; thus, the $x$ and $y$ deflections on the display during any one sweep are linear functions of time. In a similar manner, the potentials from integrators $Z_3$ and $Z_4$ are linear functions of time during any one sweep. The integrators $Z_3$ and $Z_4$ and the deflection sweep generators for the Display Device are synchronized by virtue of being reset by the same reset pulses. Thus, there is a one-to-one correspondence between the instantaneous position of the beam in the Display Device and the computing circuits. The $x$ and $y$ sweeps may be generated in the same manner as in a television set; that is, a roster scan. In this manner the continuum of points is generated, and for each point the distances $d_r$ are continuously computed as functions of time and hence, by virtue of the linear relation between time and deflection, as functions of the point $xy$ on the display.

FIGURE 4 shows, in detail, one of the Input Control Circuits, the Common Control Circuit, the Circuit for Computing $\sin \theta_r \cos \theta_r$ associated with the Input Control Circuit and the corresponding Circuit for Computing $|d_r|$. In this figure the intervals timed by the timing networks, the relative magnitudes of several of the critical components and the approximate magnitudes of several of the critical time constant circuits are indicated. It is to be understood that these intervals, magnitudes and relative magnitudes are given in FIGURE 4 for the purpose of aiding those skilled in the art in practicing this invention, and with not intention of limiting the scope of the invention.

As shown in FIGURE 4 each Input Control Circuit includes an amplifier 11 and a pair of differentiating networks 13 and 15. The input signal pulse, assumed to be a pulse of duration $\theta_r$, as shown, is impressed on the input of the amplifier 11. The outputs of the amplifier 11 are connected to the differentiating networks 13 and 15. The network 13 differentiates the leading edge of the input pulse, producing a short pulse corresponding to the leading edge, and the network 15 differentiates the trailing edge of the input pulse producing a short pulse corresponding to the trailing edge. The short pulse corresponding to the leading edge is impressed on the Common Control Circuit through conductors $a_r$ and I–1.

Each Input Control Circuit also includes a gate $G_1$ and a pair of flip-flops $FF_2$ and $FF_3$. The gate G1 is maintained open so long as it receives a signal from the Common Control Circuit through conductors O–1 and $br$. The output pulse of the differentiating network 13 which produces a pulse corresponding to the leading edge of the input pulse is impressed on gate G1. The output of gate G1 is impressed on flip-flop $FF_2$ and $FF_3$. As indicated by the numeral 1 at the input terminal 17 of the flip-flop $FF_2$ connected to G1, the latter produces an output signal when an input is impressed on terminal 17. As indicated by the label O at the input terminal 19 of the flip-flop $FF_3$ connected to gate G1, the latter ($FF_3$) terminates production of a signal when an input is impressed on this terminal 19. Flip-flop $FF_2$ has, in addition to the terminal 17 connected to the gate G1 a pair of "off" terminals 21 and 23. One of these, 21, is connected to be supplied from the differentiating network 15 which differentiates the trailing edge of the input pulse. The other, 23, is connected through conductors $cr$ and O-2 to the Common Control Circuit. Flip-flop $FF_3$ also has an input terminal 25 connected to the Common Control Circuit. When a signal is impressed on this input terminal 25, flip-flop $FF_3$ transmits a signal.

Flip-flops $FF_2$ and $FF_3$ have output terminals 26 and 28, respectively. Terminal 26 is connected to supply the decoded $\theta_r$ signal to the Circuit for Computing sin $\theta_r$ cos $\theta_r$ and terminal 28 is connected to reset conductor $e_r$.

The Common Control Circuit includes a mixer M1 to which the signals from the individual Input Control Circuit are supplied through conductor I-1. The output of mixer M1 is connected to a gate $G_2$. The Common Control Circuit also includes a flip-flop $FF_1$ and a plurality of delay networks D1, D2 and D3. Delay networks D1 and D2 time an interval of relatively long duration of the order of 10 milliseconds, and network D3 times a relatively short duration, of the order of 1 millisecond. The output terminal 27 of flip-flop $FF_1$ is connected to gate $G_2$ and maintains it open so long as $FF_1$ has an output signal. The terminal 27 is also connected to conductor O-1.

The gate $G_2$ is connected to delay D1 so that when it transmits a signal D1 starts to time out. Delay D1 is connected to input terminal 29 of $FF_1$ and when D1 times out and terminal 29 receives a signal, $FF_1$ stops supplying a signal through terminal 27. $FF_1$ has another terminal 31. A signal impressed on terminal 31 causes $FF_1$ to supply a signal through 27. Delay D1 is also connected to delay D2 and when it transmits a signal, it actuates delay D2 to start timing out.

Delay D2 is connected to supply a signal to display time timer D4. This display time timer has two output terminals, 33 and 35. Terminal 33 is connected to the Display Device through conductor O-3. Normally the Display Device is blanked and the intensity is suppressed, except while the display time timer D4 is timing out, during which time the intensity is unblocked so that the Display Device intensity is determined by the output of either of the Adding Circuits. The other output terminal 35 of the display time timer D4 is connected to conductor O-2 and to the input of delay D3. The output of delay D3 is connected to terminal 31. When the display time timer D4 times out, it transmits signal through O-2 and also to D3 to start the timing out of the latter. When D3 times out, it impresses a signal on terminal 31 to cause $FF_1$ to deliver a signal through O-1.

The Circuit for Computing the sin $\theta_r$ cos $\theta_r$ includes means for computing sin $\theta_r$ and cos $\theta_r$ from $\theta_r$ and storing the magnitudes computed until the circuit is reset. This Circuit includes a plurality of switches SW1, SW2, SW3, SW4 which are preferably of the electronic type, a pair of integrating circuits Z1 and Z2, and a pair of inverters V1 and V2. Each of the switches SW1 and SW2, is connected to the output terminal 26 of the flip-flop $FF_2$, and is open so long as no signal is transmitted through 26 and is closed only while a signal is transmitted through 26. Each of the switches SW3 and SW4 is connected to the output terminal 28 of flip-flop $FF_3$ and while flip-flop $FF_3$ transmits a signal these are maintained closed. The switches SW3 and SW4 are open while flip-flop $FF_3$ does not transmit a signal.

Each of the integrating circuits Z1 and Z2 includes amplifier of high negative gain 53 and 55 across which are connected feedback capacitors 41 and 43. Resistors 45 and 47 are connected to the inputs to amplifiers 53 and 55. Each integrating circuit Z1 and Z2 is connected in series with an associated normally open switch SW1 and SW2 so that each capacitor 41 and 43 is charged through the resistors 45 and 47 when the associated switch is closed. The potential of the capacitor is thus proportional to the negative of the time integral of the magnitude of the potential which produce the charging. The constants of proportionality are the reciprocal of the product of resistor 45 and capacitor 41 for the case of integrator Z1, and similarly the reciprocal of the product of resistor 47 and capacitor 43 for the case of integrator 22. The capacitor 41 is shunted by normally closed switch SW3 and capacitor 43 is shunted by switch SW4 in series with direct current supply 51. So long as the switches SW3 and SW4 are closed, capacitor 41 is maintained discharged and capacitor 43 is charged to the potential of 51.

Each of the inverters V1 and V2 includes a pair of resistors 57 and 59 and 61 and 63 in series, one of which has an inverting amplifier 65 and 67 connected across it.

The integrators Z1 and Z2 are connected in a circuit with one of the inverters V2; this circuit extends from a terminal of the normally open switch SW1 through the integrator Z1, the other switch SW2, the other integrator Z2, the inverter V2 to the remaining terminal of the first normally open switch SW1. When the normally open switches are closed, the integrating circuits so connected then perform a double integration. Thus, they, in effect, carry out the solution of the differential equation $$\ddot{Z} + WZ = 0$$

where the variable $Z$ is represented by the potential of terminal 73, $W$ is the reciprocal of the product of resistors 45 and 47 and capacitors 41 and 43, and the initial conditions of the variable $Z$ are the initial value of the potential of terminal 73 which is equal to that of direct current supply 51 and its derivative which is zero.

The first integrator Z1 is also connected to the second inverter V1. Call the potential of terminal 77 the variable $Zz$. Since $Zz$ is obtained from the inverter V2 whose input is the potential $Z$ on terminal 73, $Zz$ is equal to $-Z$. Call the potential of terminal 71 the variable $Z3$. Since this is obtained from the integrator Z1 whose input is the potential $Z2$ on terminal 77 when switch SW1 is closed, $Z3$ is equal to the integral of the potential $Zz$ times a factor $W$ equal to minus the reciprocal of the product of the values of resistor 45 and capacitor 41. Since the said variable $Z$ on terminal 73 is obtained from the integrator $Zz$ whose input is the potential $Z3$ on terminal 71 when switch SW2 is closed, the potential $Z$ is equal to the integral of the potential $Z3$ times the factor $W$, equal to minus the reciprocal of resistor 47 times capacitor 43, which are the same as resistor 45 and capacitor 41. If we assume a solution for $Z$ of the form:

$$Z = Zo \cos wt$$

where $Zo$ is the potential of direct current supply 51, then $$Z_2 = -Z = -Zo \cos wt$$

Also, $$Z_3 = w \int Z_2 dt = -Zo \sin wt + C_1$$

The constant $C_1$, however, is zero since integrator Z1 is shorted by switch SW3 prior to time $t = 0$ and since sin $wo = 0$.

Also, $$Z = W \int Z_3 dt$$
$$Z = W \int -Zo \sin wt$$
$$Z = Zo \cos wt + C_z$$

The constant $C_z$ is zero, however, since the potential $Z$ is made equal to $Zo$, the potential of direct current supply 51, when SW4 is closed prior to time $t = 0$ and since cos $wo = 1$. Thus $Z = Zo \cos wt$ satisfies the orignal assumed form and the mathematical relations between the potentials of integrators Z, and Zz and the inverter VZ and is hence the only solution.

The signals which appear at the output terminals 71 and 73 of the two integrators Z1 and Z2 are proportional to $-\sin Wt$ and $+\cos Wt$, respectively; that is, the solution of the equation $\ddot{Z}+WZ=0$ where $t$ the independent variable time. The time $t$ for which switches SW1 and SW2 remain closed is made equal to $\theta_r$ divided by W, terminals 71 and 73 thus represent $-\sin \theta_r$ and $+\cos \theta_r$ when switches SW1 and SW2 are opened. The potentials of terminals 71 and 73 remain at values proportional to $-\sin \theta_r$ and $+\cos \theta_r$ until switches SW3 and SW4 are closed by the signal on conductor $er$ when subsequent circuits have operated. The potentials at the output terminals 75 and 77 of the two inverters V1 and V2 are respectively $\sin \theta_r$ and $-\cos \theta_r$.

The circuit for Computing $|d_r|$ includes a pair of potentiometers 81 and 83, a pair of integrating circuits Z3 and Z4, a summing amplifier S1 and a network K1 for converting the signal $d_r$ into its absolute magnitude. One of the potentiometers 81 is connected between the terminals 71 and 75 so that the potential impressed across its terminals is equal to the difference between $-\sin \theta_r$ and $\sin \theta_r$ or $2 \sin \theta_r$. The adjustable arm 82 of this potentiometer is, in the practice of this invention, set at the magnitude $x_r$ so that the potential derivable between this arm and the terminal 71 is $2x_r \sin \theta_r$. The other potentiometer 83 is connected between the output terminals 73 and 77 so that the potential difference across it is equal to $-2 \cos \theta_r$. The adjustable arm 84 of this potentiometer is set at $y_r$ so that the potential derivable between the arm and terminal 73 is $-2y_r \cos \theta_r$. Terminals 71 and 82 are interconnected through resistors 86 and 88 and terminals 73 and 84 are interconnected through resistors 90 and 92.

Each of the integrators Z3 and Z4 includes a capacitor 85 and 87 across amplifiers 93 and 95 having high negative gains, and having their inputs connected to resistors 89 and 91. The capacitors 85 and 87 and the resistors 89 and 91 are related as indicated so that the time constant of the integrator Z3 is equal to the interval of between reset pulses of the $x$ sweep of the display and the time constant of the integrator Z4 is equal to the interval between successive reset pulses for the $y$ sweep of the display. Amplifiers 93 and 95 are connected to each of the capacitors 85 and 87, respectively, and an electronic switch SW5 and SW6 (normally open) is connected across each. The switch SW5 is controlled from the $x$ reset pulses of the display and is closed to reset capacitor 85 by each pulse. The switch SW6 is controlled from the $y$ reset pulses and is closed at each instant when a $y$ reset pulse is impressed thereon. The capacitors 85 and 87 may charge during the intervals between $x$ and $y$ reset pulses, respectively.

Integrating circuit Z3 is connected to be supplied through resistor 94 from terminal 71 and Z4 and through resistor 96 from terminal 73, the potential on the former being $-\sin \theta_r$ and on the latter $\cos \theta_r$. Between $x$ reset pulses capacitor 85 is then charged at a rate proportional to $-\sin \theta_r$ and between $y$ reset pulses capacitor 87 is charged at a rate proportional to $\cos \theta_r$. Therefore, the potentials of capacitors 85 and 87 have sawtooth wave forms, the magnitudes of which at any instant are proportional to the $x$ magnitude times $-\sin \theta_r$ and to the $y$ magnitude times $\cos \theta_r$, respectively.

The summing amplifier S1 includes a pair of resistors 97 and 99 and an amplifier 101 which is shunted by a reset switch SW7 which is connected to conductor $fr$ and is maintained closed so long as there is a signal on $fr$. Resistors 86, 88, 94, 92, 90 and 96 are connected to a common conductor 98. Conductor 98 is connected to the summing amplifier S1 and the amplifier adds the signals supplied across resistors 88, 86, 94, 92, 90, 96. This sum is proportional to $(x-x_r) \sin \theta_r - (y-y_r) \cos \theta_r = d_r$.

The network K1 for converting $d_r$ into the absolute magnitude $|d_r|$ includes a pair of oppositely poled double diodes 103 and 105 and an inverter V3 and has an output at the junction of the diodes 103 and 105. The output of the summing amplifier S1 is connected directly to diode 103 and through the inverter V3 to diode 105 and thus a signal $|d_r|$ appears at the output regardless of the polarity of $d_r$.

The outputs of $|d_r|$ are connected to the intensity control conductor IN as shown in FIG. 5 or as shown in FIG. 8. In each case the circuit for coupling only one of the $d_r$ signals is shown in detail. The other signals are similarly coupled as indicated.

The apparatus shown in FIG. 5 includes an amplifier 111. The signal $|d_r|$ and a bias $-v$ are impressed on the input of this amplifier 111 each through a resistor 113 and 115 and an output $V_r$ is derived therefrom. The output $V_r$ is zero for $|d_r|$ greater than $v$ and of constant magnitude 1 for $|d_r|$ less than $v$. The output of the amplifier 111 is impressed through a resistor 117 and a gate G3 across a potentiometer 119. The arm 121 of the potentiometer is connected to the conductor IN and controls the contrast or relative degree of intensity modulation of the Display Device. The gate G3 is opened to transmit a signal when the scan unblanking signal on conductor O–3 from the Common Control Circuit is applied. Output $V_r$ for all of the $d_r$ signals are similarly impressed through gate G3 on conductor IN. The effect on the intensity of the Display Device depends on the totality of signals impressed through the resistors 117.

The operation of the apparatus shown in FIG. 5 may be further explained by reference to FIGS. 6A and 6B. In FIG. 6a the voltage $|d_r|$ is plotted vertically and time horizontally. A broken line having the magnitude V is shown above the time axis. The curve of generally sawtooth form is a plot of the magnitude $|d_r|$ as a function of time as the display is swept. In FIG. 6B the magnitude $V_r$ is plotted as a function of time. $V_r$ is plotted vertically and time horizontally.

The output $V_r$ is, as indicated in connection with FIG. 5, zero so long as $|d_r|$ exceeds the magnitude $v$. Thus $V_r$ consists of a plurality of rectangular loops each having a duration corresponding to the time during which the magnitude $v$ exceeds $|d_r|$. The voltage is impressed on the intensity control conductor IN of the Display Device and has a magnitude and duration corresponding to the square wave loops. This is indicated in FIG. 7, in which the display is diagrammatically shown. The display signal is visible only in the portions of the display corresponding to the loops.

FIG. 7 is represented as presenting a visible signal for the intervals during which only one $|d_r|$ is less than $v$. This is for purposes of illustration only. In the actual practice of the present invention the contrast control of the Display Device would be so adjusted that the signals corresponding to a single line of bearing only are not displayed even if they are less than $v$. The durations of the signals which pass through the amplifiers 111 are always such as to give a constant normal line width on the display independently of bearing. Thus, if the line of bearing is parallel to the $x$ axis sweep, the signal actually extends over several $x$ sweeps and indicates coincidence with any other intersecting lines of bearings.

The apparatus shown in FIG. 8 is another Adding Circuit to obtain a signal proportional to the square root of the sum of the squares of $d_r$. The terminal having a signal proportional to $|d_r|$ impressed, is connected to a network including a diode 127 and a resistor 129 and is also grounded through a resistor 131. The network 127–129 is connected through a resistor 133 to resistor 134 and to the gate G3. The other signals $d_r$ are similarly impressed on the gate G3. The relative values of resistors 131, 129, 133 and 134 are chosen in accordance with network design practice familiar to the art such that the signal transmitted to the gate G3 through the network is proportional within about 5% to the square root of the sum of the square of $d_r$ for the six bearing lines. In the practice of this invention, the polarity of the signal transmitted through gate G3 is made such that the larger its magnitude, the less is the intensity of the display at that point.

Standby

In the standby condition of the apparatus, the system shown in FIGS. 3 and 4 is energized and ready to receive signals. In the practice of the invention the system includes a number of discharge devices which are heated, and the grid circuits and anode circuits of which are ready to change their conductivities as required.

The flip-flop $FF_1$ in the Common Control Circuit is enabled by a delay D3 when the apparatus is energized to deliver a signal, and is shown shaded to indicate this condition. The gates G1 are then open and ready to transmit a signal to flip-flops FF2 and FF3 in each Input Control Circuit. In addition gate G2 is open. Gates G1 and G2 are also shown shaded. In the absence of signals at the inputs flip-flops FF2 are in a quiescent condition in which they do not deliver signals to the normally open switches SW1 and SW2 to which they are connected. Flip-flops FF3, having been enabled by D4, are delivering signals to the normally closed switches SW3, SW4 and SW7 to which they are connected, so that these switches are closed. The capacitors 43 and 45 of the integrators Z1 and Z2 in the Circuits for Computing $\sin \theta_r \cos \theta_r$ are then discharged and the summing amplifiers S1 in the Circuits for Computing $|d_r|$ are in shorted condition. The display time timer D4 is not actuated to deliver a scan unblanking signal O–3. The sweeps of the Display Device may be operating continuously or may be caused to stop during Standby operation. Reset pulses may be delivered continuously to the switches SW5 and SW6 connected across the capacitor 85 and 87 of the integrators Z3 and Z4 for producing the potentials of sawtooth wave form or may be removed during Standby operation. The intensity of the Display Device is blanked during Standby operation so that even with sweeps applied and operating no signals are displayed. The generation of the $x$ and $y$ sweeps is accomplished by common techniques evident to persons skilled in the art.

Operation

When there is a sferic at a point in space, pulses of a duration equal to the angles of bearings of the sferic with respect to the various direction finding stations are transmitted to the amplifier 11. Assume that a signal from one of these stations $r$ arrives first. This signal may be designated as a bearing signal for a bearing $\theta_r$. The pulse equal in duration to $\theta_r$ is received at the amplier 11 and differentiated by the differentiating networks 13 and 15 so that a short pulse is transmitted from the network 13 through the gating network G1 to the flip-flop FF2 at an instant corresponding to the leading edge of the timing pulse $\theta_r$ and another peak pulse is transmitted to the flip-flop FF2 at an instant corresponding to the trailing edge of the pulse $\theta_r$. A decoded signal of time duration equal to $\theta_r$ is then transmitted by the flip-flop FF2. The short pulse corresponding to the leading edge of the pulse $\theta_r$ is also transmitted through the gate G1 to the flip-flop FF3, turning this flip-flop off. The short pulse corresponding to the leading edge of the pulse $\theta_r$ is also transmitted to the mixer M1 and through the gate G2 to the delay network D1 starting the timing out of the delay network. While delay network D1 is timing out $\theta_r$ signals are being received from the other five stations. Each of these signals causes its associated flip-flop FF2 to transmit a decoded $\theta$ signal to its associated Circuit and turns off its associated flip-flop FF3. These latter $\theta_r$ signals have no effect on the Common Control Circuit, its operation being started by the first signal.

On receiving signals from each Input Control Circuit the associated Circuit for Computing $\sin \theta_r \cos \theta_r$ starts its computing operation. When FF3 stops sending a signal, switches SW3, SW4, SW7 are opened, enabling the capacitors 41 and 43 in the integrators Z1 and Z2 to perform their integrating operation.

In addition, the $\theta_r$ decoded signal from each flip-flop FF2 closes the associated switches SW1 and SW2 for a time interval equal to the $\theta_r$ signal and the double integration operation is carried out by the two integrators Z1 and Z2. This integration operation continues for a time interval equal to $\theta_r$ for each Circuit for Computing $\sin \theta_r \cos \theta_r$, and the capacitors 41 and 43 are charged and discharged and recharged, respectively, and store the charge which they accumulate during this time interval. Since FF3 is at this time quiescent, the switches SW3 and SW4 remain open and the charge on each capacitor 41 and 43 remains. The charge accumulated by the capacitors 41 and 43 is such that potentials equal to $-\sin \theta_r$, $\cos \theta_r$, $\cos \theta_r$, $\sin \theta_r$ and $-\cos \theta_r$ appear at each set of terminals 71, 73, 75, 77 and are impressed across the pairs of potentiometers 81 and 83 in the associated Circuit for Computing $|d_r|$. Potentials proportional to $x_r \sin \theta_r$ and $y_r \cos \theta_r$ then appear respectively between the adjustable arms 82 and 84 of the potentiometers 81 and 83 and the terminals 71 and 73.

While the signals $\sin \theta_r$, $\cos \theta_r$, $x_r \sin \theta_r$, $y_r \cos \theta_r$ are being generated and stored for the six stations, D1 is timing out and when it times out a signal is transmitted to flip-flop FF1 and to delay D2. Flip-flop FF1 is then turned off, disabling the gates G1 and G2 and blocking the flow of further signals through the gates. All Input Control Circuits and the Common Control Circuit then become disabled. No further signals can now be received and thus the receipt of confusing signals, for example, from another sferic are to the extent practicable prevented.

The delay network D2 now times out. Network D2 introduces a delay between the interruption of the receipt of signals and the transmission of unblanking signals to assure that the integrating and storing operation for all of the received signals will be carried out before there is any further operation on the stored signals.

At the end of the time interval timed by D2 this network times out and transmits a signal to the display time timer D4 which causes intensity control of the Display Device to be unblanked. Sweep reset pulses are continuously or beginning at this time transmitted through the conductors $g_r$ and $h_r$ and switches SW5 and SW6 close instantaneously on the receipt of each respective pulse and then immediately reopen. Integrators Z3 and Z4 then produce and impress on the summing amplifier $S_1$ signals proportional to $x \sin \theta_r$ and $y \cos \theta_r$. In addition, the signals proportional to $x_r \sin \theta_r$ and $y_r \cos \theta_r$ are impressed and signals $|d_r|$ appear at the outputs of the Circuits for Computing $|d_r|$ and are impressed on the amplifier 111.

The result is that the intensity of the Display Device is modulated through IN by the output of either Adding Circuit, which produces signals which are functions of either the number of values of $(d_r)$ less than some prescribed amount or the sum of the squares of $(d_r)$ respectively. In either event a bright signal is displayed in the region of the display corresponding to the fix. In this manner, a very precise determination of the position of a point in space is achieved. The display is unblanked for one or more complete $x$, $y$ sweeps.

During this operation the display time timer D4 times out and the display is blanked again. To facilitate observation the Display Device may be of the type that retains its display for a time interval after the display is blanked. In addition, a signal is now transmitted at D4 to all flip-flops FF2 and FF3. The blocking of flip-flops FF2 is now assured, so that all associated normally open switches SW1 and SW2 now remain open. Flip-flops FF3 are reset to transmit through conductors $e_r$ and $f_r$ a signal reclosing the associated normally closed switches SW3, SW4, SW7 and resetting the integrators Z1 and Z2 and shorting the summing amplifier S1. The display time timer D4 on timing out also starts the timing out of delay D3. After D3 times out, which allows time for the above integrator resetting operations to be completed, it resets FF1 so that gates G1 and G2 are open to receive the signals from another sferic.

*Conclusion*

While a preferred embodiment of this invention has been disclosed herein, many modifications thereof are feasible. For example, the lines of bearings could have a width proportional to the distance of each point from the direction finding station. The addition of this feature may result in a display more desirable than the one described above, since a fix according to the angular distance from the lines of bearing rather than the normal distance could be displayed. Such a display would be independent of the position along the lines of bearing. Thus, if three lines of bearing intersect in a triangle, the point corresponding to the most probable position of the point in space the position of which is to be determined is nearest to the line of bearing from the nearest station rather than the center of the triangle giving equal normal distances for each line. In addition, the sweeps of the display device could be curved lines if such are required to eliminate the effect of the curvature of the earth. In view of the different modifications feasible the invention is not to be restricted except insofar as is necessitated by the spirit of the prior art.

What I claim is:

1. The system of locating a point having bearings $\theta_1$, $\theta_2 \ldots \theta_n$, respectively, with reference to $n$ stations with locating apparatus including means for generating a display means for determining the square of the distance, $d^2$, of each of a continuum of points on said display from $n$ hypothetical lines on said display, the said $n$ lines corresponding to the $n$ lines of bearing of said point to be located with reference to said stations, said continuum including a point corresponding to said point to be located, circuitry for adding for each point of said continuum the $n$ magnitudes $d^2$ which correspond to the distances of said last named point from said $n$ hypothetical lines, and means for producing a signal on said display having an intensity at each of said points of said continuum corresponding to some function of said sum.

2. The system of displaying a "fix" of a point having bearings $\theta_1$, $\theta_2 \ldots \theta_n$, respectively, with respect to $n$ stations including means for generating a two dimensional display of the type in which each point of a continuum including a point corresponding to said point in space is defined by Cartesian coordinates $x$, $y$, said stations being identified by coordinates $x_1y_1$, $x_2y_2 \ldots x_ny_n$ on said display, potential responsive means for modulating the intensity of the display at each point of said display means for computing the absolute magnitude $|d_r|$ for each of said bearings and for each point $x,y$ of the display, where $$|d_r| = |(x-x_r) \sin \theta_r - (y-y_r) \cos \theta_r|$$

where $r=1,2, \ldots n$, means for deriving for each point $(x,y)$ a potential proportional to said sum of the magnitudes $|d_r|$ for all values of $r$ and means for impressing said potential on said modulating means to modulate the intensity at each point of said display in accordance with some function of said sum.

3. The system of displaying a "fix" of a point in space having bearings $\theta_1$, $\theta_2 \ldots \theta_n$, respectively, with respect to $n$ stations including display means of the type in which each point of a continuum including a point corresponding to said point in space is defined by Cartesian coordinates $x,y$, said stations being identified by coordinates $x_1y_1$, $x_2y_2 \ldots x_ny_n$ on said display, potential responsive means for modulating the intensity of the signal at each point on said display means, means for measuring the magnitude $d_r^2$ for each of said bearings and for each point $x,y$ of the display, where $$d_r = (x-x_r) \sin \theta_r - (y-y_r) \cos \theta_r$$

where $r=1,2, \ldots n$, means for deriving for each point $(x,y)$ a potential proportional to said sum of the magnitudes $d_r^2$ for all values of $r$ and means for impressing said potential on said modulating means to modulate the intensity at each point of the display in accordance with some function of said sum.

4. Computing apparatus for determining the absolute magnitude of the distance, $|d_r|$ of each of a continuum of points, $x,y$, of a Cartesian coordinate system from bearing lines in said system, each of said lines being at a bearing angle $\theta_r$, said angle $\theta_r$ corresponding to the bearing of a point in space, the location of which is to be determined, with reference to $n$ stations, $\theta_1$ corresponding to the first said station, $\theta_2$ to the second, $\theta_r$ to the $r$th and $\theta_n$ to the $n$th, the location of each of said stations being identified by coordinates $x_ry_r$ in said Cartesian system and said stations transmitting a time potential signal having a duration equal to the angle $\theta_r$, the said apparatus including electrical integrating means for solving the differential equation $\ddot{z}+wz=0$ and having input means on which a potential corresponding to variable $z$ may be impressed and output means from which potentials corresponding to said input means for impressing said time potential signal corresponding to an angle $\theta_r$ on said integrating means, whereby potential signals proportional to sin $\theta_r$, cos $\theta_r$ are derivable from said output means, means connected to said output means for deriving the magnitude $$d_r = (x-x_r) \sin \theta_r - (y-y_r) \cos \theta_r$$

and means conected to said deriving means for deriving the absolute magnitude $|d_r|$ from the magnitude $d_r$.

5. In combination display apparatus including a display device, means for producing orthogonally related $x$ and $y$ sweeps to scan said device, and means for modulating the intensity of the display on said producing means including first means for generating reset pulses for said $x$ sweep, and second means for generating reset pulses for said $y$ sweep, first means when actuated for producing a first potential having a sawtooth wave form, said first producing means having terminals, the slope of said first potential being substantially proportional to the potential impressed between said terminals, second means when actuated for producing a second potential having a sawtooth wave form, said second producing means having terminals, a slope of said second potential being substantially proportional to the potential impressed between said last-named terminals, first deriving means having input and output terminals for deriving a potential substantially proportional to sin $\theta_r$ from said output terminals when a potential having a duration substantially proportional to $\theta_r$ is impressed on said input terminals, second deriving means having input and output terminals for deriving a potential substantially proportional to cos $\theta_r$ from said last-named output terminals when a potential having a duration substantially proportional to $\theta_r$ is impressed on said last-named input terminals, means connecting said output terminals of said first deriving means to said terminals of said first producing means, means connecting said first generating means to said first producing means for actuating said first producing means to start a potential wave of sawtooth wave form for each reset pulse for said $x$ sweep, means connecting said second generating means to said second deriving means for actuating said second producing means to start a potential wave of sawtooth wave form for each reset pulse of said $y$ sweep, and means responsive to said potentials of sawtooth wave form connected to said modulating means for modulating the intensity of the display on said display device.

6. In combination an integrating network, normally open switch means connected to said network blocking the integrating operation of said network, first means connected to said switch means responsive to a time signal of a predetermined duration for closing said switch means only for the duration of said signal to permit integrating operation of said network, normally closed switch means connected to said network, said last-named switch means maintaining said network reset so long as it is closed, second means connected to said last-named switch means responsive to said time signal for opening said last-named switch means at the beginning of said time signal, said last-named switch means when opened as aforesaid remaining open independently of the duration of said time signal, time delay means, means connected to said first time-signal responsive means and to said time delay means and responsive to said time signal for starting the timing out of said delay means on the occurrence of said time signal, and means connected to said delay means and to said normally closed switch means responsive to the timing out of said delay means for closing said normally closed switch means.

7. In combination an integrating network, normally open switch means connected to said network blocking the integrating operation of said network, first means connected to said switch means responsive to a time signal of a predetermined duration for closing said switch means only for the duration of said time signal to permit integrating operation of said network, normally closed switch means connected to said network, said last-named switch means maintaining said network reset so long as it is closed, second means connected to said last-named switch means responsive to said time signal for opening said last-named switch means at the beginning of said time signal, said last-named switch means when opened as aforesaid remaining open independently of the duration of said time signal, time delay means, means connected to said first time-signal responsive means and to said time delay means and responsive to said time signal for starting the timing out of said delay means on the occurrence of said time signal, means connected to said delay means and to said normally closed switch means responsive to the timing out of said delay means for closing said normally closed switch means, display means, gating means connected to said display means normally blanking said display means, additional time delay means, said additional delay means timing out in an interval substantially shorter than the interval in which said first-named delay means times out, means connected to said first-named delay means and to said additional delay means for starting the timing out of said additional delay means a predetermined time interval after said first-named delay means starts to time out, said additional delay means timing out before said first-named delay means times out, means connected to said additional delay means and to said gating means for actuating said gating means to unblank said display means during the interval that said additional delay means is timing out, and means connected to said network and to said display means for displaying a signal dependent on the integrating operation of said network.

8. The system of locating a point having bearings $\theta_1, \theta_2 \ldots \theta_n$, respectively, with reference to $n$ stations with locating apparatus including means for generating a display and circuitry for determining the distance $d$ of each of a continuum of points on said display from $n$ hypothetical lines on said display, the said $n$ lines corresponding to the $n$ lines of bearing with reference to said stations of said point to be located, said continuum including a point corresponding to said point to be located, for each point of said continuum means for producing a signal on said display having an intensity at each of said points corresponding to a function of said distances, $d$, wherein is provided means for increasing the intensity of the signal on said display for all points the distances $d$ of which is less than a predetermined magnitude relative to all points the distances $d$ is greater than a predetermined magnitude.

References Cited in the file of this patent

UNITED STATES PATENTS

| | | |
|---|---|---|
| 2,402,688 | Skurnick | June 25, 1946 |
| 2,415,190 | Rajchman | Feb. 4, 1947 |
| 2,428,966 | Gage | Oct. 14, 1947 |
| 2,480,208 | Alvarez | Aug. 30, 1949 |
| 2,483,140 | Higham | Sept. 27, 1949 |
| 2,625,667 | Chance | Jan. 13, 1953 |
| 2,684,474 | Kass | July 20, 1954 |
| 2,703,203 | Bishop | Mar. 1, 1955 |
| 2,808,987 | Speller et al. | Oct. 8, 1957 |